(12) United States Patent
Zhang et al.

(10) Patent No.: US 10,989,215 B2
(45) Date of Patent: Apr. 27, 2021

(54) COMPRESSOR SYSTEM EQUIPPED FOR FUGITIVE GAS HANDLING AND FUGITIVE GAS SYSTEM OPERATING METHOD

(71) Applicant: Solar Turbines Incorporated, San Diego, CA (US)

(72) Inventors: Donghui Zhang, San Diego, CA (US); Christopher Moffatt, San Diego, CA (US); Avneet Singh, San Diego, CA (US); Sean Garceau, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 808 days.

(21) Appl. No.: 15/695,507

(22) Filed: Sep. 5, 2017

(65) Prior Publication Data
US 2019/0072102 A1    Mar. 7, 2019

(51) Int. Cl.
| F04D 29/10 | (2006.01) |
| F16J 15/00 | (2006.01) |
| F04D 25/08 | (2006.01) |
| F04D 27/00 | (2006.01) |
| F04D 29/12 | (2006.01) |
| F01D 11/00 | (2006.01) |

(52) U.S. Cl.
CPC .......... *F04D 29/102* (2013.01); *F04D 25/08* (2013.01); *F04D 27/009* (2013.01); *F04D 29/124* (2013.01); *F16J 15/004* (2013.01); *F01D 11/00* (2013.01)

(58) Field of Classification Search
CPC ...... F04D 29/102; F04D 29/122; F04D 25/08; F04D 27/009; F16J 15/004; F01D 11/00
See application file for complete search history.

(56) References Cited

U.S. PATENT DOCUMENTS

| 8,382,469 | B2 | 2/2013 | Malm |
| 9,046,062 | B2 | 6/2015 | Tice |
| 2006/0157251 | A1 | 7/2006 | Stinessen et al. |
| 2006/0275716 | A1 | 12/2006 | Marty et al. |
| 2010/0158717 | A1* | 6/2010 | Vogt .................. F04B 25/02 417/401 |

(Continued)

FOREIGN PATENT DOCUMENTS

| EP | 2463240 B1 | 8/2015 |
| IN | 4104/DEL/2015 A | 7/2016 |

(Continued)

*Primary Examiner* — Brian P Wolcott
*Assistant Examiner* — Aye S Htay
(74) *Attorney, Agent, or Firm* — Brannon Sowers & Cracraft

(57) ABSTRACT

A compressor system includes a gas compressor with dry gas seals about a driveshaft. The compressor system also includes a fugitive gas system having a gas conduit in fluid communication with a collection cavity in a collector coupled to the gas compressor to receive fugitive gas leaked through a pressurized gas leakage path. The fugitive gas system may be structured for flaring the gas, and includes a pressure control system with an accumulator tank, and a vent line for venting gas pressure and having a backpressure regulator therein. Fugitive combustible gas is conveyed through a flow restriction orifice downstream of the compressor.

17 Claims, 4 Drawing Sheets

(56) References Cited

U.S. PATENT DOCUMENTS

| | | | |
|---|---|---|---|
| 2010/0294374 A1* | 11/2010 | Sears | F04D 29/124 |
| | | | 137/1 |
| 2012/0085690 A1 | 4/2012 | Hass | |
| 2013/0170961 A1* | 7/2013 | Meucci | F01D 25/22 |
| | | | 415/170.1 |
| 2014/0250857 A1 | 9/2014 | Kajita | |
| 2015/0330261 A1* | 11/2015 | Held | F01D 11/003 |
| | | | 60/326 |
| 2016/0236147 A1 | 8/2016 | Chen | |

FOREIGN PATENT DOCUMENTS

| | | |
|---|---|---|
| JP | 6362292 | 7/2018 |
| WO | 2016139283 A1 | 9/2016 |

* cited by examiner

COMPRESSOR SYSTEM EQUIPPED FOR FUGITIVE GAS HANDLING AND FUGITIVE GAS SYSTEM OPERATING METHOD

TECHNICAL FIELD

The present disclosure relates generally to the field of gas transfer and distribution, and more particularly to apparatus for handling fugitive gas leaked through a dry gas seal in a compressor.

BACKGROUND

Large and heavy-duty gas compressors are used in a variety of applications throughout the world. On natural gas drilling platforms, at wellheads, at transmission stations, and for storage and/or liquefaction, it is generally desirable and necessary to pressurize the natural gas or increase its relative pressurization state. Certain industrial applications and local distribution infrastructures also employ gas compressors. Gas compressors having various designs are used for these purposes, including centrifugal flow compressors, axial flow compressors, reciprocating compressors, screw compressors, and variations or combinations of these general types.

In many gas compressor designs it is necessary to provide seals between rotating components such as a compressor shaft, and stationary components such as the compressor housing. Some seal designs employ oil or other fluids to provide a gas-tight barrier to prevent or minimize gas leakage. In other systems a so-called dry gas seal is used, where no liquid is used for preventing gas from leaking between components and, in fact, dry gas seals are typically designed with some allowance for gas leakage intended or even desired. In the case of combustible gases such as natural gas, the gas which does leak through dry gas seals is conventionally discharged to the atmosphere. While the amount of gas leakage may be relatively small compared to the overall throughput of the gas compressor, there remains an interest in reducing or eliminating discharge of leaked combustible gases such as natural gas, methane and other hydrocarbon gases, to atmosphere. U.S. Pat. No. 9,046,062, for example, proposes a capture system and method where gas leaked from a compressor is provided to the intake pathway of an engine driving the compressor.

SUMMARY OF THE INVENTION

In one aspect, a compressor system includes a gas compressor having a compressor housing with a low pressure inlet and a high pressure outlet formed therein. The gas compressor further includes a rotor positioned within the compressor housing, the rotor including a driveshaft and being rotatable to compress a gas conveyed through the compressor housing between the low pressure inlet and the high pressure outlet. The gas compressor further includes a dry gas seal positioned about the driveshaft and forming a pressurized gas leakage path. The compressor system further includes a fugitive gas system having a collector coupled with the compressor housing and forming a collection cavity in fluid communication with the pressurized gas leakage path, and a gas conduit having a fugitive gas inlet in fluid communication with the collection cavity, and a fugitive gas delivery outlet. The fugitive gas system further includes a pressure control system having a pressure reservoir positioned fluidly between the fugitive gas inlet and fugitive gas delivery outlet, and a vent line. The vent line has a gas venting outlet, and a gas venting inlet in fluid communication with the gas conduit, and a backpressure regulator positioned fluidly between the gas venting outlet and the gas venting inlet.

In another aspect, a fugitive gas system for a gas compressor includes a collector forming a collection cavity positionable in fluid communication with a pressurized gas leakage path in a gas compressor, and a gas conduit having a fugitive gas inlet in fluid communication with the collection cavity, and a fugitive gas delivery outlet. The fugitive gas system further includes a pressure control system having a pressure reservoir positioned fluidly between the fugitive gas inlet and the fugitive gas delivery outlet. The pressure control system further includes a vent line having a gas venting inlet in fluid communication with the gas conduit, a gas venting outlet, and a backpressure regulator positioned fluidly between the gas venting inlet and the gas venting outlet.

In still another aspect, a method of operating a gas compressor includes conveying a combustible fugitive gas leaked through a dry gas seal in a gas compressor through a gas conduit in a fugitive gas system coupled to the gas compressor. The method further includes charging a gas pressure reservoir in the fugitive gas system with the combustible fugitive gas, and delivering combustible fugitive gas from the gas pressure reservoir to a delivery outlet of the gas conduit for consumption in a gas-consuming process. The method still further includes increasing a pressure of combustible fugitive gas within the fugitive gas system at a location upstream of the pressure reservoir. The method still further includes venting combustible fugitive gas from the fugitive gas system, in response to the increasing of the pressure, by way of a backpressure regulator in a vent line fluidly connected with the gas conduit at a location upstream of the gas pressure reservoir.

DETAILED DESCRIPTION

Figure 1:
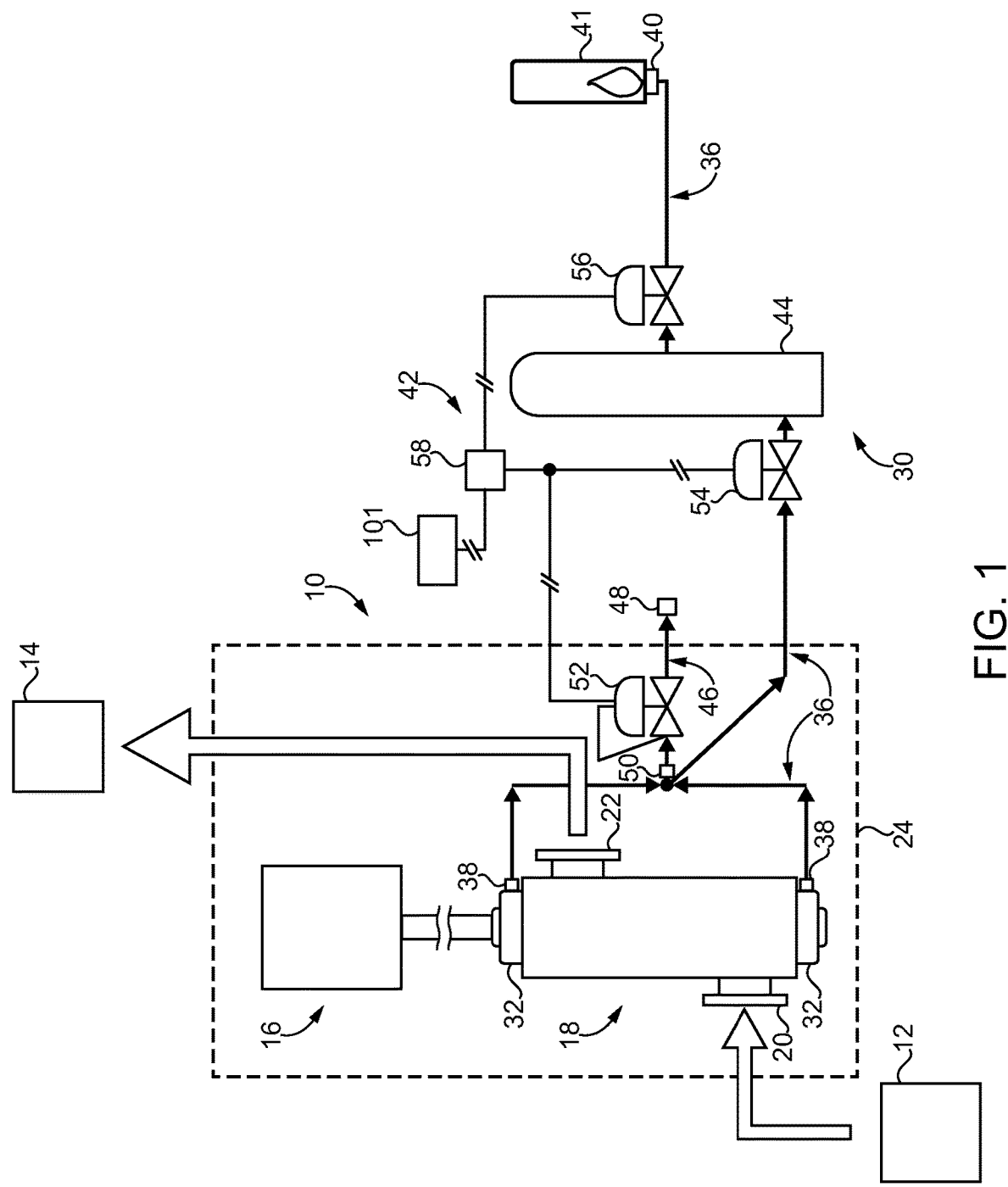
FIG. 1 is a schematic view of a compressor system, according to one embodiment.

Referring to FIG. 1, there is shown a compressor system 10 according to one embodiment. Compressor system 10 may include a gas compression system of a type used in relatively large scale natural gas transfer and/or distribution systems. Compressor system 10 may be coupled with and receive a feed of natural gas from an extraction location 12, and pressurize the natural gas for transmission to an end user 14. The extraction site or location can include a wellhead, for example, from which the natural gas stream can be conveyed to a refinery prior to receipt by compressor system 10. Various regional and local distribution infrastructure may lie between compressor system 10 and end user 14. Applications to natural gas transmission as discussed herein are contemplated to be a practical implementation, however, the present disclosure is not thereby limited and could be applied to compressor systems used in different environments. Compressor system 10 can include a number of components and subsystems mounted upon a frame or skid 24, including a gas compressor 18 powered by a combustion engine 16. Combustion engine 16 could include a gas turbine engine, a reciprocating internal combustion diesel engine, or another engine type. It is contemplated that fueling engine 16 with natural gas provides a practical implementation strategy, although any suitable fuel could be used.

Compressor system 10 further includes a fugitive gas system 30 coupled with compressor 18, and including a collector 32, and a gas conduit 36 having a fugitive gas inlet 38, and a fugitive gas delivery outlet 40. Fugitive gas system 30 further includes a pressure control system 42 having a gas pressure reservoir 44 positioned fluidly between fugitive gas inlet 38 and fugitive gas delivery outlet 40. A vent line 46 having a gas venting outlet 48, and a gas venting inlet 50 in fluid communication with gas conduit 36 is provided, with a backpressure regulator 52 positioned fluidly between gas venting inlet 50 and gas venting outlet 48. A gas supply shutoff valve 54 is positioned upstream of gas pressure reservoir 44, which may include an accumulator tank also identified with reference numeral 44. An outlet shutoff valve 56 is positioned downstream of gas pressure reservoir 44. As used herein, the term "upstream" means toward fugitive gas inlet 38, and "downstream" means toward fugitive gas delivery outlet 40. Gas conduit 36 may be structured to feed fugitive combustible gas by way of fugitive gas delivery outlet 40 to a gas flaring apparatus 41 that is fed by fugitive gas delivery outlet 40. Gas flaring apparatus 41 can include an enclosure, a gas nozzle, valves and pressure and/or temperature monitoring equipment (not shown). Other implementations are contemplated herein where rather than flaring fugitive combustible gas, the fugitive combustible gas is used in another gas-consuming process, such as in fueling a combustion engine, as a reductant supply in an exhaust treatment or industrial process, or for still another purpose. As will be further apparent from the following description, the present disclosure is contemplated to provide for improved utilization of combustible fugitive gas over traditional techniques such as continuously venting the combustible fugitive gas to atmosphere. In addition to applications for energy recovery, flaring the gas can convert hydrocarbon gas and oxidant to $CO_2$ and water, which may be more desired in some instances from an emissions perspective.

Figure 2:
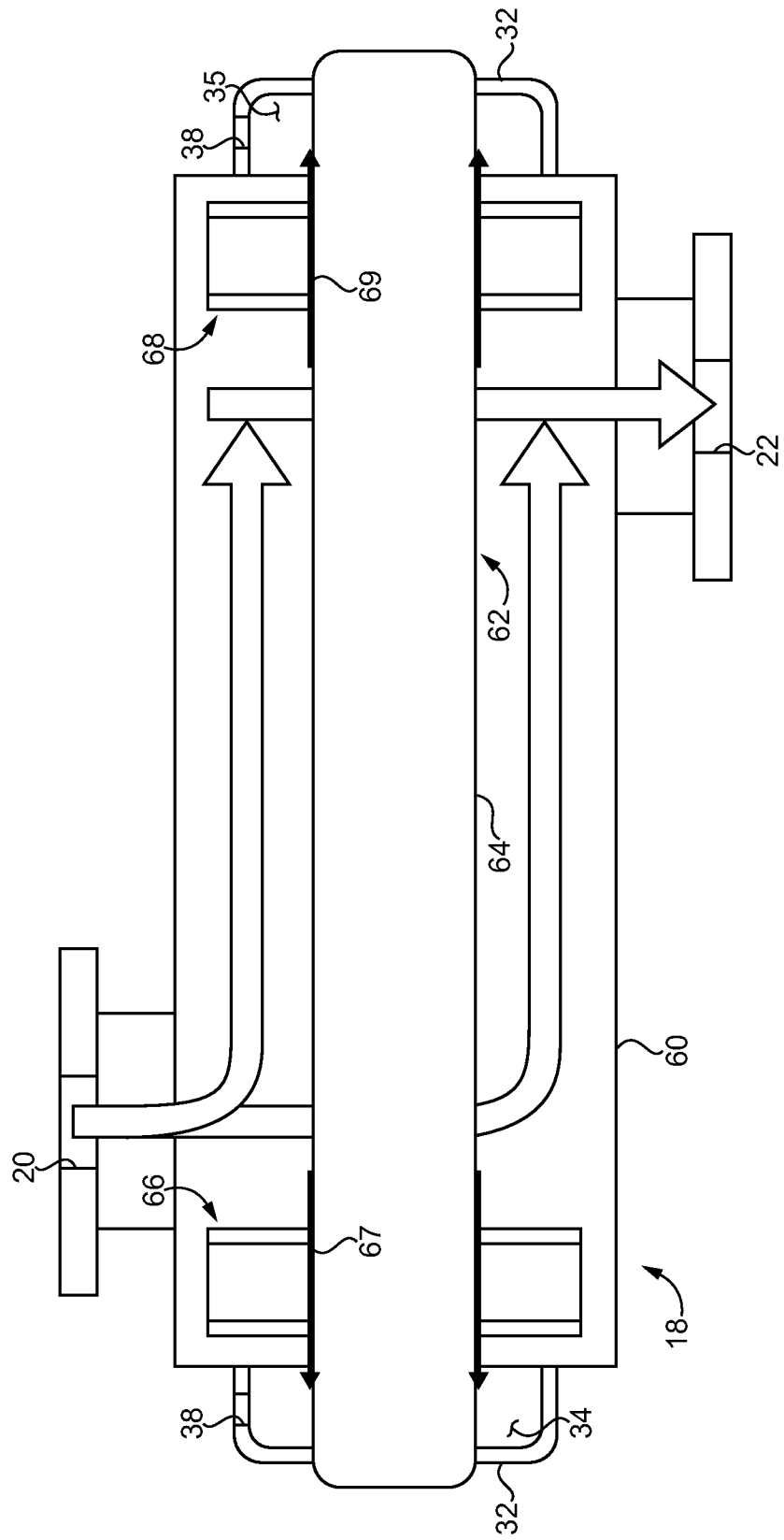
FIG. 2 is a sectioned side diagrammatic view of a compressor suitable for use in the compressor system of FIG. 1, according to one embodiment.

Referring also now to FIG. 2, gas compressor 18 includes a compressor housing 60 having a low pressure inlet 20 and a high pressure outlet 22 formed therein. A rotor 62 is positioned within compressor housing 60 and is rotatable to compress a gas, such as but not necessarily natural gas, conveyed through compressor housing 60 between low pressure inlet 20 and high pressure outlet 22. Gas compressor 18 may further include apparatus within compressor housing 60 that enables centrifugal compression of the gas conveyed between low pressure inlet 20 and high pressure outlet 22. In one embodiment, a series of impellers or centrifugal compressor rotors are positioned upon driveshaft 64. In other instances, both centrifugal compression and axial compression or combinations of these flow patterns could be employed in gas compressor 18. Gas compressor 18 further includes a dry gas seal 66, and typically also a second dry gas seal 68, positioned about driveshaft 64 and forming a pressurized gas leakage path 67 and 69, respectively. The direction of arrows in FIG. 2 through leakage path 67 and 69 illustrates an approximate axially outward flow of fugitive gas through pressurized gas leakage path 67 and pressurized gas leakage path 69. Collector 32 is also identified in FIG. 2, and can include first and second collector components (not numbered) positioned approximately at opposite ends of driveshaft 64. Collector 32 forms a collection cavity 34 in fluid communication with pressurized gas leakage path 67, and another collection cavity 35 in fluid communication with pressurized gas leakage path 69. Gas conduit 36 includes fugitive gas inlet 38 in fluid communication with collection cavity 34 and also in fluid communication with collection cavity 35. During operating compressor 18 fugitive gas can leak through leakage path 67 and leakage path 69, and then be conveyed through collection cavities 34 and 35, respectively, to fugitive gas inlet 38 to be handled in a manner further discussed herein.

Figure 3:
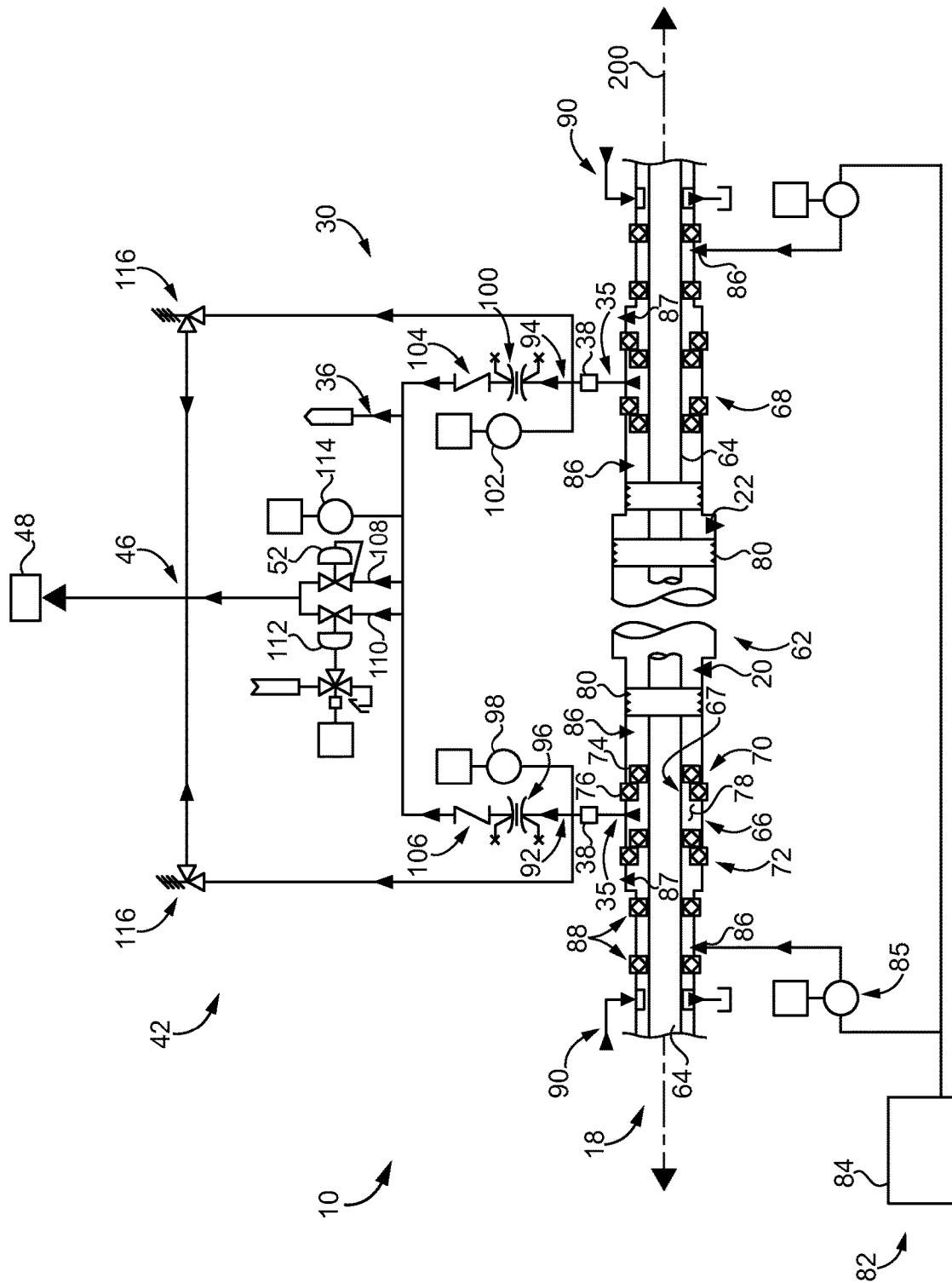
FIG. 3 is a schematic illustration of components of the compressor system of FIG. 1.

Turning now to FIG. 3, there is shown compressor system 10 including further aspects and details thereof. The following description focuses on elements shown on one side of rotor 62, and associated for example with an intake or suction side compressor 18. It will be appreciated that other components may be analogously configured for the discharge or outlet side or end of rotor 62. Thus, the discussion herein of seals, fugitive gas flow, buffer gas flow, and other features described in connection with the suction side analogously refer to the discharge side. Dry gas seal 66 may include an inner sealing element 70 and an outer sealing element 72 forming a space 78 therebetween. Space 78 may extend circumferentially around rotor 62, and is in fluid communication with collection cavity 34, with fugitive gas leaking past one or both of inner sealing element 70 and outer sealing element 72. Dry gas seal 66 may further be structured such that inner sealing element 70 includes a first seal component 74 that is rotatable with driveshaft 64, and a second seal component 76 that is stationary with respect to compressor housing 60. Fugitive gas can leak between component 74 and component 76 by way of pressurized gas leakage path 67 in at least certain dry gas seal configurations. Other seal configurations could have different leakage paths.

Also shown in FIG. 3 is a lubrication system 90 that provides lubricating oil to rotor 62 and driveshaft 64 in a generally conventional manner. Also shown is a buffer gas system 82 that provides buffer gas such as air, nitrogen, mixtures, or another buffer gas, at a number of gas delivery locations shown via reference numeral 86. A flow sensor is shown at numeral 85. Buffer gas venting locations are shown at reference numeral 87. Buffer gas seals 88 can also be positioned axially outward of dry gas seal 66. Driveshaft 64 is rotatable about an axis 200 and can be rotatably journaled within compressor housing 60 and supported against thrust loading by suitable journal bearings and/or thrust bearings (not shown in FIG. 3) in a generally conventional manner. A labyrinth seal 80 or another suitable inner seal may be associated with each of the suction side, the left side in FIG. 3, and the discharge side, the right side in FIG. 3, and may be exposed to a flow and pressure of the gas being compressed.

It can further be seen from FIG. 3 that gas conduit 36 forms a first fugitive gas flow path 92 from collection cavity 34, and a second fugitive gas flow path 94 from collection cavity 35 that is fluidly in parallel with fugitive gas flow path 92. Fugitive gas system 30 can further include a first flow restriction orifice 96 within first fugitive gas flow path 92, and a first pressure sensor 98 positioned upstream of first flow restriction orifice 96 to sense a gas pressure of first fugitive gas flow path 92. A second flow restriction orifice 100 is within second fugitive gas flow path 94, and a second pressure sensor 102 is positioned upstream of second flow restriction orifice 100 to sense a gas pressure of fugitive gas flow path 94.

Referring back to FIG. 1, fugitive gas system 30 can further include an electronic control unit 58 within pressure control system 42. Electronic control unit 58 includes a data processor, such as a microprocessor, microcontroller, field programmable gate array (FPGA), or another computer control device, in control communication with gas supply shutoff valve 54, outlet shutoff valve 56, pressure sensor 98, pressure sensor 102, and various other electronic and electronically controlled components of compressor system 10 as contemplated herein. The sensors in pressure control system 42 are shown, collectively, at a block 101 in FIG. 1. Fugitive gas system 30 may further include an anti-backflow valve 104 positioned within fugitive gas flow path 92, and another anti-backflow valve 106 positioned within fugitive gas flow path 94. One or more overpressure relief valves 116 may be in fluid communication with fugitive gas flow path 92 and/or fugitive gas flow path 94, as further discussed herein.

Also shown in FIG. 3 is a first gas venting path 108 formed by vent line 46 and extending from and in fluid communication with gas conduit 36. A second gas venting path 110 formed by vent line 46 extends from and is in fluid communication with gas conduit 36 and is fluidly in parallel with gas venting path 108. Backpressure regulator 52 is within gas venting path 108. In an implementation, backpressure regulator 52 can include a ball valve that is spring-biased. Other implementations could include other designs, including an electronically controlled backpressure regulator. Fugitive gas system 30 further includes a rapid venting valve 112 within gas venting path 110. A pressure sensor 114 is also operably coupled with gas conduit 36 at a location downstream of flow restriction orifice 96 and downstream of flow restriction orifice 100, enabling sensing an inlet pressure to vent line 46.

Figure 4:
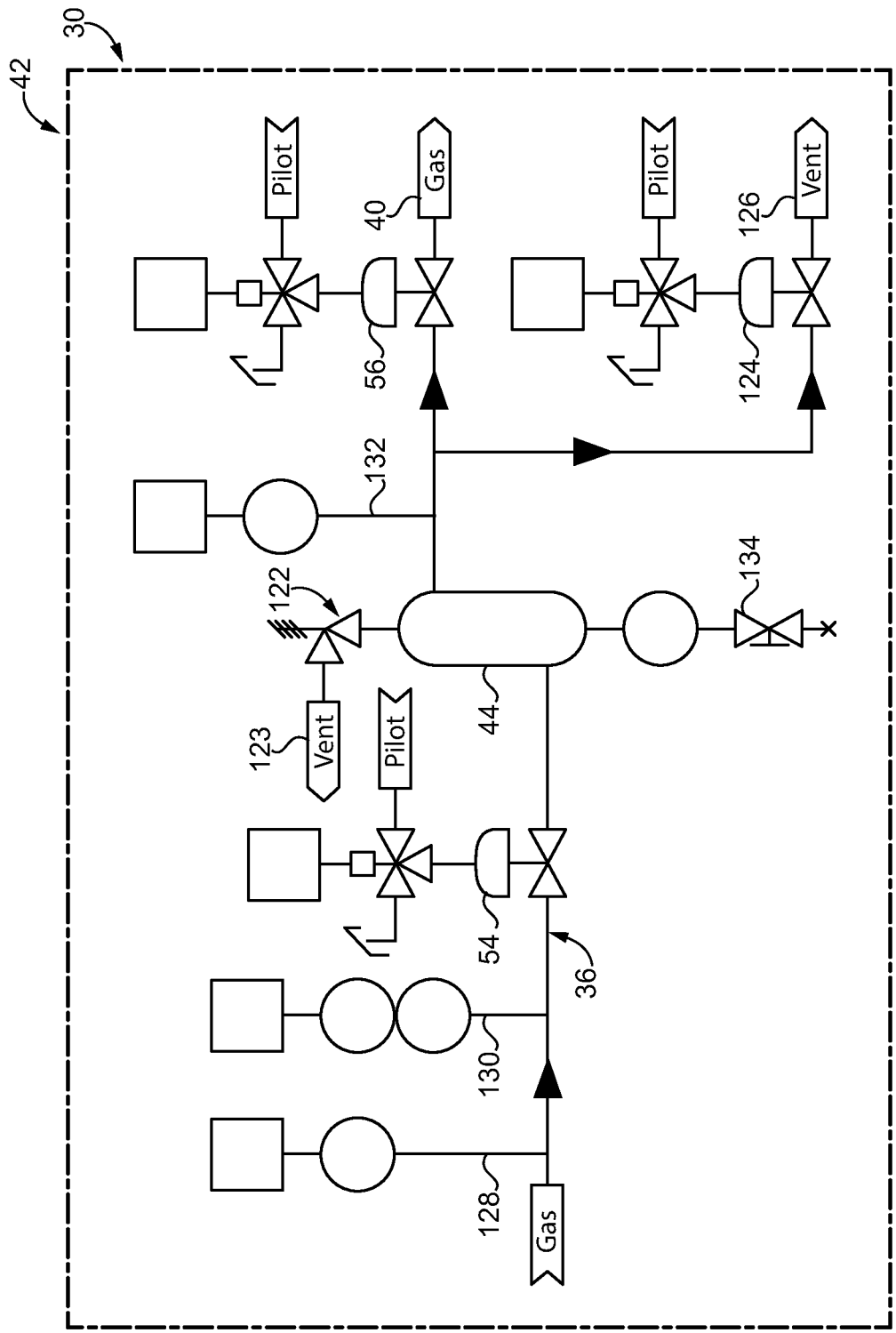
FIG. 4 is a schematic view of portions of a fugitive gas system, according to one embodiment.

Referring now to FIG. 4, there are shown still other features of fugitive gas system 30, including a tank vent valve 124 in fluid communication with pressure reservoir 44, and an overpressure relief valve 122 also in fluid communication with pressure reservoir 44. It can be seen that tank vent valve 124 is in fluid communication with gas conduit 36 at a location that is fluidly between pressure reservoir or accumulator tank 44 and gas outlet shutoff valve 56. A manually operable liquid drain valve 134 is also fluidly connected with pressure reservoir 44. Fugitive gas system 30 may also include a pressure sensor 128 and a temperature sensor 130 each operably coupled with gas conduit 36 at a location upstream of gas supply shutoff valve 54. It can be seen from FIG. 4 that positioning gas supply shutoff valve 54 upstream of pressure reservoir 44 and positioning outlet shutoff valve 56 downstream of pressure reservoir 44, and positioning tank vent valve 124 fluidly between outlet shutoff valve 56 and pressure reservoir 44 enables flexibility in pressure control and monitoring. Pressure sensor 132 enables a pressure in pressure reservoir 44 to be monitored, such as by electronic control unit 58. For example, it can be really determined by way of pressure sensor 132 if pressure reserve 44 remains pressurized even where disconnected from compressor 18 by way of gas supply shutoff valve 54. Outlet shutoff valve 56 enables isolating pressure reservoir 44 from the gas-consuming process/apparatus, whether it be flaring apparatus 41 or another gas-consuming process/apparatus. Overpressure relief valve 122 may be connected with a vent 123, and tank vent valve 124 may be connected with the same or another vent 126. Pressure sensor 128 and temperature sensor 130 enable monitoring of pressure and temperature to protect pressure reservoir 44 from excessive pressure and/or temperature. Each of gas supply shutoff valve 54, outlet shutoff valve 56, tank vent valve 124, and rapid venting valve 112 may be pilot-actuated, and coupled with a pilot valve whose position or state is electronically controlled by electronic control unit 58. Overpressure relief valve(s) 116 and overpressure relief valve 122 may be passively operated devices, as may backpressure regulator 52 as noted above, although the present disclosure is not thereby limited.

INDUSTRIAL APPLICABILITY

Referring to the drawings generally, during operating compressor system 10, rotor 62 may be rotated so as to transition a combustible gas between low pressure gas inlet 20 and high pressure gas outlet 22. The conveying of the combustible gas through compressor housing 60 can include increasing a pressure of the combustible gas. During the operating of compressor system 10, combustible fugitive gas can leak through dry gas seal 66 and dry gas seal 68, to be collected in collector 32 and conveyed from collection cavities 34 and 35 into fugitive gas flow path 92 and fugitive gas flow path 94. The fugitive combustible gas can be conveyed through flow restrictions 96 and 100 such that the leaked fugitive combustible gas can be pressurized upstream of flow restriction orifices 96 and 100. Downstream of flow restriction orifices 96 and 100, gas conduit 36 may be at a lower pressure than upstream thereof.

The fugitive combustible gas is thenceforth conveyed through gas conduit 36 and through gas supply shutoff valve 54 to charge gas pressure reservoir 44. Depending upon a state of outlet shutoff valve 56, the combustible fugitive gas can be conveyed from pressure reservoir 44 to flaring apparatus 41 by way of fugitive gas delivery outlet 40. It can be desirable to provide the combustible fugitive gas to flaring apparatus 41, or another gas-consuming process, at a relatively smooth and typically uniform pressure. Operation of compressor system 10 can be dynamic, typically most acutely during startup or shutdown, speed changes, or in response to changes in inlet pressure or the level of backpressure at high pressure outlet 22. For these and other reasons it is desirable to employ several mechanisms by which pressure reservoir 44 and other components can be protected from pressure and/or temperature extremes, while maintaining a relatively consistent and smooth flow of gas to flaring apparatus 41. In the ordinary course of operation, there may be periods where a pressure of combustible fugitive gas in collection cavities 34 and/or 35, or in gas conduit 36 at various locations upstream of pressure reservoir 44, increases. Where a pressure of the combustible fugitive gas increases above a threshold pressure, or where a rate of change in pressure exceeds some threshold rate of change, or some other pressure or temperature property of the combustible fugitive gas so justifies, combustible fugitive gas can be vented by way of backpressure regulator 52 or rapid venting valve 112. As noted above, backpressure regulator 52 can operate passively, opening in response to a backpressure in gas conduit 36, which may be observed as a fluid pressure sensed by way of pressure sensor 114, for example. Apart from the passive operation of backpressure regulator 52, pressure signals from one or more of pressure sensor 98, pressure sensor 102, or pressure sensor 114 or even potentially pressure sensor 128, can be evaluated by electronic control unit 58, compared with stored threshold pressure(s), and rapid venting valve 112 operated to rapidly release excess pressure. Overpressure relief valves 116 may open to relieve excess pressure, for instance, where a pressure increase occurs faster than that which can be acted upon by electronic control unit 58. In one other example operation, outlet shutoff valve 56 could be closed to stop flaring of gas at flaring apparatus 41. Pressure sensor 132 could monitor pressure of pressure reservoir 44, with electronic control unit 58 commanding opening tank vent valve 124 should a pressure level in pressure reservoir 44 (or another pressure or temperature property) exceed a predefined threshold. In the case of a pressure level or change in pressure level occurring too quickly for electronic control unit 58 and/or tank vent valve 56 to respond, overpressure relief valve 122 may operate to vent excess pressure.

From the foregoing description and attached drawings it will be appreciated that fugitive gas system 30 and pressure control system 42 can operate in a variety of ways, depending upon such factors as whether flaring apparatus 41 is operating, what valves are open or closed, and what the pressure levels and/or changes in pressure level, as well as relative pressure levels, are at various locations. Equipping fugitive gas system 30 with upstream pressure monitoring and control associated with vent line 46, and also downstream pressure monitoring and control associated with pressure reservoir 44, allows for protecting of components sensitive to overpressure and/or backpressure conditions, including pressure reservoir 44 and potentially bearings for driveshaft 64, regardless of a present state of compressor system 10 with respect to gas flaring, compressor speed, compressor inlet and/or outlet pressures, duty cycle, valve open/closed states, and still other factors.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A compressor system comprising: a gas compressor including a compressor housing having a low pressure inlet and a high pressure outlet formed therein, and a rotor positioned within the compressor housing, the rotor including a driveshaft and being rotatable to compress a gas conveyed through the compressor housing between the low pressure inlet and the high pressure outlet; the gas compressor further including a first dry gas seal positioned about the driveshaft and forming a pressurized gas leakage path; a fugitive gas system including a collector coupled with the compressor housing and forming a first collection cavity in fluid communication with the pressurized gas leakage path, and a gas conduit having a fugitive gas inlet in fluid communication with the first collection cavity, and a fugitive gas delivery outlet; and the fugitive gas system further including a pressure control system having a pressure reservoir positioned fluidly between the fugitive gas inlet and the fugitive gas delivery outlet, a vent line having a gas venting outlet, and a gas venting inlet fluidly connected to the gas conduit at a location that is fluidly between the first collection cavity and the pressure reservoir, and a backpressure regulator positioned fluidly between the gas venting outlet and the gas venting inlet.

2. The compressor system of claim 1 wherein:
the gas compressor further includes a second dry gas seal positioned about the driveshaft and forming a second pressurized gas leakage path, and the collector forms a second collection cavity in fluid communication with the second pressurized gas leakage path and with the gas conduit; and
the fugitive gas system further includes a first flow restriction orifice and a second flow restriction orifice positioned, respectively, between the pressure reservoir and the first collection cavity and the second collection cavity.

3. The compressor system of claim 2 wherein the pressure reservoir includes an accumulator tank, and further comprising a gas supply shutoff valve positioned upstream of the accumulator tank, and an outlet shutoff valve positioned downstream of the accumulator tank.

4. The compressor system of claim 3 further comprising a tank vent valve in fluid communication with the gas conduit at a location that is fluidly between the accumulator tank and the outlet shutoff valve.

5. The compressor system of claim 4 wherein each of the gas supply shutoff valve, the outlet shutoff valve, and the tank vent valve is pilot-actuated, and the compressor system further comprises a first pressure sensor operably coupled with the gas conduit at a location that is upstream of the gas supply shutoff valve, and a second pressure sensor operably coupled with the gas conduit at a location that is upstream of the outlet shutoff valve and downstream of the accumulator tank.

6. The compressor system of claim 2 further comprising gas flaring apparatus fed by the fugitive gas delivery outlet.

7. The compressor system of claim 6 wherein the first dry gas seal and the second dry gas seal each include an inner sealing element and an outer sealing element forming a space therebetween, and the first collection cavity and the second collection cavity are in fluid communication with the spaces formed between the corresponding inner sealing element and outer sealing element.

8. A fugitive gas system for a gas compressor comprising: a collector forming a first collection cavity positionable in fluid communication with a pressurized gas leakage path in a gas compressor; a gas conduit having a fugitive gas inlet in fluid communication with the first collection cavity, and a fugitive gas delivery outlet; and a pressure control system including a pressure reservoir positioned fluidly between the fugitive gas inlet and the fugitive gas delivery outlet; the pressure control system further including a vent line having a gas venting inlet fluidly connected to the gas conduit at a location that is fluidly between the first collection cavity and the pressure reservoir, a gas venting outlet, and a backpressure regulator positioned fluidly between the gas venting inlet and the gas venting outlet.

9. The system of claim 8 further comprising a gas supply shutoff valve positioned upstream of the pressure reservoir, and an outlet shutoff valve positioned downstream of the pressure reservoir, and wherein the pressure reservoir includes an accumulator tank.

10. The system of claim 9 further comprising an overpressure relief valve and a tank vent valve each in fluid communication with the accumulator tank.

11. The system of claim 10 wherein each of the gas supply valve, the outlet shutoff valve, and the tank vent valve is pilot-actuated.

12. The system of claim 9 further comprising a pressure sensor and a temperature sensor each operably coupled with the gas conduit at a location upstream of the gas supply shutoff valve.

13. The system of claim 9 further comprising a gas flaring apparatus fed by the fugitive gas delivery outlet.

14. The system of claim 9 wherein the collector forms a second collection cavity positionable in fluid communication with a second pressurized gas leakage path in the gas compressor, and the gas conduit is in fluid communication with each of the first collection cavity and the second collection cavity.

15. The system of claim 14 wherein:
the gas conduit forms a first fugitive gas flow path from the first collection cavity, and a second fugitive gas flow path from the second collection cavity that is fluidly in parallel with the first fugitive gas flow path; and the system further comprising:
a first flow restriction orifice within the first fugitive gas flow path, and a first pressure sensor positioned upstream of the first flow restriction orifice to sense a gas pressure of the first fugitive gas flow path; and
a second flow restriction orifice within the second fugitive gas flow path, and a second pressure sensor positioned upstream of the second flow restriction orifice to sense a gas pressure of the second fugitive gas flow path.

16. The system of claim 15 wherein:
the vent line forms a first gas venting path from the gas conduit, and a second gas venting path from the gas conduit that is fluidly in parallel with the first gas venting path;
the backpressure regulator is within the second venting path; and
the system further comprising a rapid venting valve within the first gas venting path.

17. The system of claim 16 further comprising a pressure sensor operably coupled with the gas conduit at a location downstream of the first flow restriction orifice and the second flow restriction orifice, to sense an inlet pressure to the vent line.

* * * * *